US012580260B2

(12) United States Patent
Ko

(10) Patent No.: US 12,580,260 B2
(45) Date of Patent: Mar. 17, 2026

(54) CYLINDRICAL SECONDARY BATTERY

(71) Applicant: Samsung SDI Co., Ltd., Yongin-si (KR)

(72) Inventor: Sung Gwi Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 748 days.

(21) Appl. No.: 17/939,810

(22) Filed: Sep. 7, 2022

(65) Prior Publication Data

US 2023/0079718 A1      Mar. 16, 2023

(30) Foreign Application Priority Data

Sep. 10, 2021      (KR) ........................ 10-2021-0121009

(51) Int. Cl.
| | |
|---|---|
| *H01M 50/213* | (2021.01) |
| *H01M 10/04* | (2006.01) |
| *H01M 10/0587* | (2010.01) |

(52) U.S. Cl.
CPC ..... *H01M 50/213* (2021.01); *H01M 10/0431* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 6,132,900 A | 10/2000 | Yoshizawa et al. | |
| 7,303,836 B2 * | 12/2007 | Kim ................... | H01M 50/531 |
| | | | 429/180 |

| | | | |
|---|---|---|---|
| 10,622,608 B2 | 4/2020 | Ko et al. | |
| 11,063,318 B2 | 7/2021 | Shin et al. | |
| 2006/0019150 A1 | 1/2006 | Rigobert et al. | |
| 2011/0123846 A1 | 5/2011 | Kim et al. | |
| 2011/0223449 A1 | 9/2011 | Rigobert et al. | |
| 2013/0095353 A1 | 4/2013 | Li et al. | |
| 2016/0181577 A1 * | 6/2016 | Kajiwara ............ | H01M 50/562 |
| | | | 429/179 |
| 2017/0309880 A1 | 10/2017 | Ko et al. | |

(Continued)

FOREIGN PATENT DOCUMENTS

| | | |
|---|---|---|
| CN | 102576829 A | 7/2012 |
| CN | 107305931 A | 10/2017 |

(Continued)

OTHER PUBLICATIONS

Korean Office Action for KR Application 10-2023-0152620, dated Sep. 26, 2024, 8 pages.

(Continued)

*Primary Examiner* — Alix E Eggerding
(74) *Attorney, Agent, or Firm* — Womble Bond Dickinson (US) LLP

(57) ABSTRACT

A cylindrical secondary battery includes: an electrode assembly including a first electrode plate and a second electrode plate; a can having a bottom part and a cylindrical side part, configured to accommodate the electrode assembly, and electrically connected to the first electrode plate; and a cap assembly. The cap assembly includes: a cap plate coupled to one end of the cylindrical side part and electrically connected to the cylindrical side part; and a rivet terminal insulated from the cap plate and electrically connected to the second electrode plate.

10 Claims, 7 Drawing Sheets

(56)        References Cited

U.S. PATENT DOCUMENTS

| | | | |
|---|---|---|---|
| 2018/0205044 A1* | 7/2018 | Urushihara | H01M 4/06 |
| 2019/0221791 A1* | 7/2019 | Wakimoto | H01M 50/50 |
| 2019/0386272 A1 | 12/2019 | Shin et al. | |
| 2021/0074978 A1 | 3/2021 | Chun | |
| 2023/0187745 A1* | 6/2023 | Choi | H01M 50/169 |
| | | | 429/181 |
| 2024/0274990 A1* | 8/2024 | Darbandi | H01M 50/593 |

FOREIGN PATENT DOCUMENTS

| | | |
|---|---|---|
| KR | 10-1999-0041759 A | 6/1999 |
| KR | 10-2005-0019359 A | 3/2005 |
| KR | 10-0522819 B1 | 10/2005 |
| KR | 10-2008-0034221 A | 4/2008 |
| KR | 10-2013-0033716 A | 4/2013 |
| KR | 10-2016-0015778 A | 2/2016 |
| KR | 10-1593532 B1 | 2/2016 |
| KR | 10-2018-0043996 A | 5/2018 |
| KR | 10-2019-0030016 A | 3/2019 |
| KR | 10-2019-0093299 A | 8/2019 |
| KR | 2021-0053105 A | 5/2021 |

OTHER PUBLICATIONS

European Extended Search Report issued in corresponding application No. EP 22194449.9, dated Feb. 9, 2023, 10 pages.
Korean Office action issued in corresponding application KR 10-2021-0121009, dated Feb. 12, 2023, 7 pages.
Chinese Office Action for CN Application No. 202211097542.6, dated Jun. 25, 2025, 6 pages.
Chinese Notice of Allowance issued in corresponding Chinese Patent Application No. 202211097542.6, dated Jan. 20, 2026, 4 pages.

* cited by examiner

CYLINDRICAL SECONDARY BATTERY

CROSS-REFERENCE TO RELATED APPLICATION

This application claims priority to and the benefit of Korean Patent Application No. 10-2021-0121009, filed on Sep. 10, 2021, in the Korean Intellectual Property Office, the entire contents of which are herein incorporated by reference.

BACKGROUND

1. Field

Aspects of embodiments of the present disclosure relate to a cylindrical secondary battery.

2. Description of the Related Art

Generally, a cylindrical secondary battery includes a cylindrical electrode assembly, a cylindrical can accommodating the electrode assembly and an electrolyte, and a cap assembly coupled to an upper opening in the can to seal the can, thereby allowing current generated in the electrode assembly to flow to an external device.

The cylindrical secondary battery generally has a structure in which the can having negative polarity and the cap assembly having positive polarity are insulated from each other by a gasket. Therefore, to electrically connect the cylindrical secondary battery to an external device, a bus bar is often welded to each of upper and lower portions of the secondary battery, which limits a structure of a battery pack or a battery module that incorporates (or uses) the cylindrical secondary battery.

The above-described information provides a brief background of the present disclosure and is only for improving understanding of the background of the present disclosure and, thus, may include information that does not constitute related (or prior) art.

SUMMARY

According to embodiments of the present disclosure, a cylindrical secondary battery in which a positive electrode and a negative electrode are disposed in one direction is provided.

According to an embodiment of the present disclosure, a cylindrical secondary battery includes: an electrode assembly including a first electrode plate and a second electrode plate; a can having a bottom part and a cylindrical side part, configured to accommodate the electrode assembly, and electrically connected to the first electrode plate; and a cap assembly. The cap assembly includes: a cap plate coupled to one end of the cylindrical side part and electrically connected to the cylindrical side part; and a rivet terminal insulated from the cap plate and electrically connected to the second electrode plate.

The cylindrical secondary battery may further include: a first electrode collecting plate electrically connected to the first electrode plate and electrically connected to the bottom part; and a second electrode collecting plate electrically connected to the second electrode plate and electrically connected to the rivet terminal. The first electrode plate may be a negative electrode plate, and the second electrode plate may be a positive electrode plate.

The cylindrical secondary battery may further include: an insulator configured to insulate the rivet terminal from the cap plate; and a gasket configured to insulate the cap plate from the cylindrical side part of the can.

The can may include: a beading part at one end of the cylindrical side part that is opened, the beading part being concavely bent inwardly; and a crimping part spaced apart from the beading part and in which one end of the cylindrical side part is bent. An end of the crimping part may be electrically connected to the cap plate.

The gasket may be spaced apart from the crimping part and may be between an outer edge of the cap plate and the beading part.

The rivet terminal may have a protrusion that protrudes toward a top surface of the cap plate, and the insulator may include an accommodation groove that accommodates the protrusion.

The cylindrical secondary battery may further include a stopper coupled to an end of the rivet terminal that faces the electrode assembly so that the rivet terminal and the insulator are in close contact with each other.

The stopper may have an opening that the rivet terminal passes through, and the opening in the stopper may have a diameter that gradually increases from a top surface to a bottom surface thereof.

The rivet terminal may further include a rib extending from an end facing the electrode assembly to be in close contact with the insulator.

The bottom part may be welded to or integrated with the cylindrical side part and may include a notch or vent.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, describes aspects and features of the present disclosure.

In the drawings:

FIG. 1D is a cross-sectional view illustrating the bottom part and the notch of a cylindrical secondary battery according to another embodiment;

DETAILED DESCRIPTION

Figure 1A:
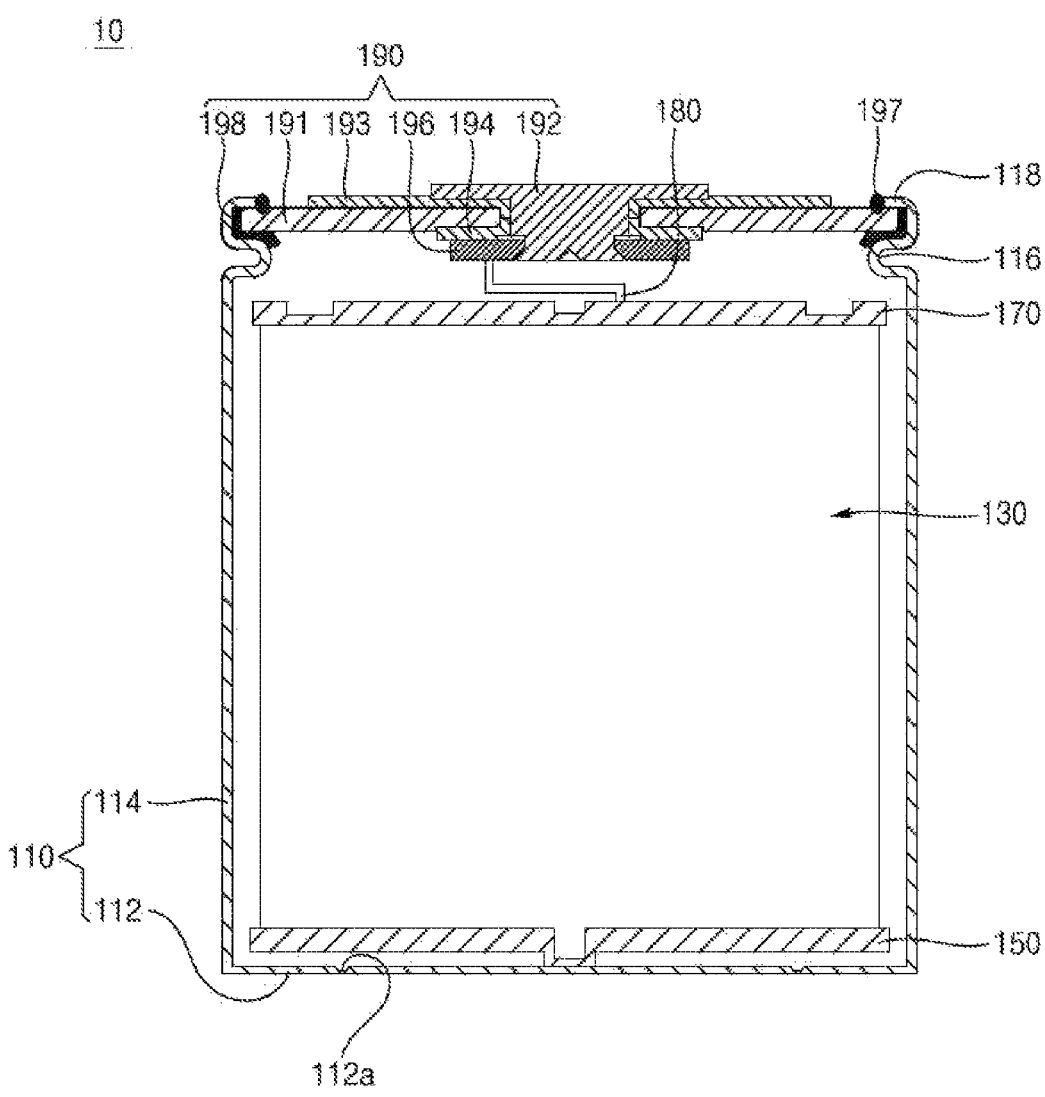
FIG. 1A is a cross-sectional view of a cylindrical secondary battery according to an embodiment.

The present disclosure may be embodied in many different forms and should not be construed as being limited to the embodiments set forth herein; rather, these embodiments are provided so that those skilled in the art thoroughly understand the present disclosure, that this disclosure will be thorough and complete, and will fully convey the scope of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a cylindrical secondary battery according to embodiments of the present disclosure will be described, in detail, with reference to the accompanying drawings, in which an upper side is defined as an upper portion or an upward direction and a lower side is defined as a lower portion or a downward direction with reference to FIGS. 1A and 1B.

Figure 1B:
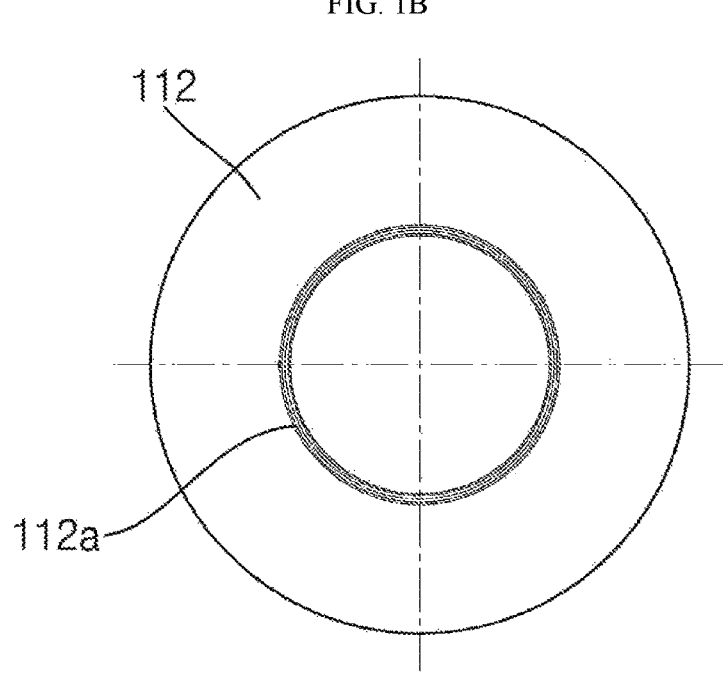
FIG. 1B is a plan view illustrating a bottom part and a notch of the cylindrical secondary battery illustrated in FIG. 1A.
Figure 1C:
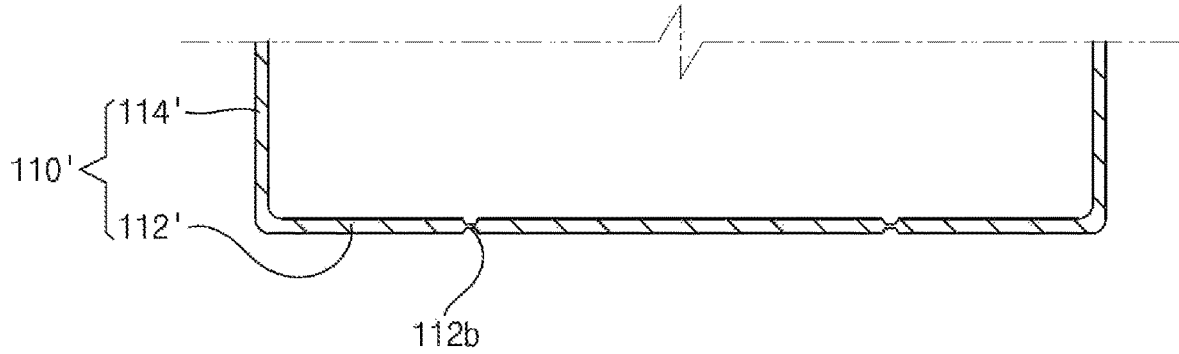
FIG. 1C is a cross-sectional view illustrating the bottom part and the notch of a cylindrical secondary battery according to another embodiment.

FIG. 1A is a cross-sectional view of a cylindrical secondary battery according to an embodiment, and FIG. 1B is a plan view illustrating a bottom part and a notch of the cylindrical secondary battery illustrated in FIG. 1A. FIG. 1C is a cross-sectional view illustrating the bottom part and the notch of a cylindrical secondary battery according to another embodiment.

As illustrated in FIG. 1A, a cylindrical secondary battery 10 may include a cylindrical can 110, an electrode assembly 130 inserted into (or accommodated in) the can 110, a cap assembly 190 coupled to one end of the can 110, and first and second electrode collecting plates 150 and 170 electrically connecting the electrode assembly 130 to the cap assembly 190. The cap assembly 190 will be described later.

The can 110 has a circular bottom part 112 and a side part 114 extending upwardly from the bottom part 112. The side part 114 has a cylindrical shape with an open top end (hereinafter, referred to as an opening). In a process of manufacturing the secondary battery 10, the electrode assembly 130 is inserted into the can 110 together with an electrolyte through the opening in the can 100. The electrode assembly 130 may be electrically connected to the can 110 and the cap assembly 190 by the first electrode collecting plate 150 and the second electrode collecting plate 170, respectively. The can 110 may be made of steel, a steel alloy, nickel-plated steel, nickel-plated steel alloy, aluminum, an aluminum alloy, or an equivalent thereof, but the material thereof is not limited thereto.

Figure 1D:
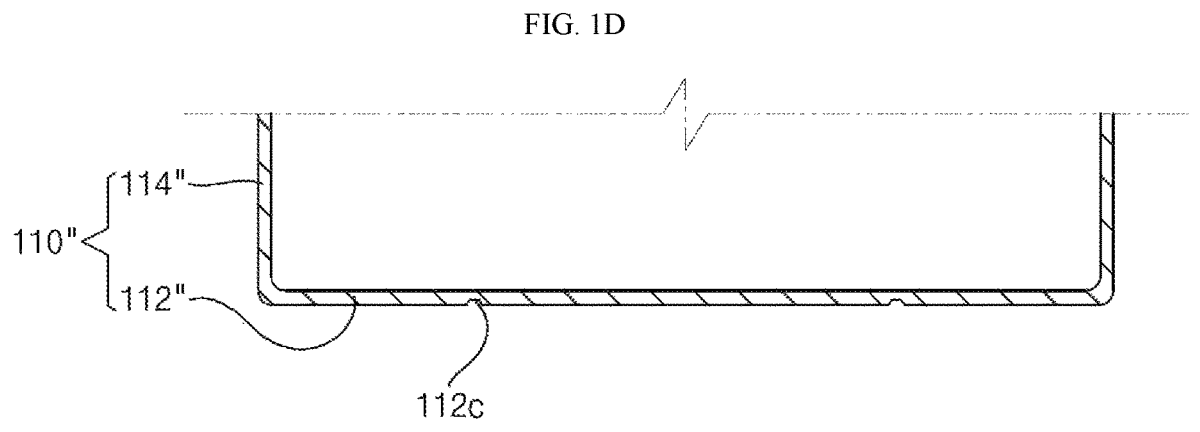

As illustrated in FIGS. 1A and 1B, a notch $112a$ may be provided in (or formed in) the bottom part 112 to act as a vent. The notch $112a$ may have a circular shape with a diameter (e.g., a predetermined diameter) in the circular bottom part 112. The notch $112a$ may be concavely formed in (e.g., may be recessed from) an inner surface of the bottom part 112 (e.g., a plate surface facing the inside of the can 110) through internal press processing. In another embodiment, as illustrated in FIG. 1C, a notch $112b$ may be concavely formed in each of an inner surface and an outer surface (e.g., a plate surface facing the outside of the can) of the bottom part 112' by performing the press processing on the inside and outside of the bottom part 112'. In another embodiment, as illustrated in FIG. 1D, a notch $112c$ may be formed in an outer surface of the bottom part 112" through external press processing. When an event occurs that causes an increase in internal cell pressure, caused by internal and external factors, gas may be generated inside the can 110, thereby increasing the pressure inside the can 110. When the pressure inside the can 110 is higher than (e.g., increases above) a certain pressure (e.g., a reference pressure), the notche $112a$, $112b$, and/or $112c$, each of which is thinner than each of the other portions of the bottom part 112 (e.g., each of which is a thinned portion of the bottom part 112 of the can 110), 112', and 112", breaks (or cracks or bursts), and thus, the gas, the electrode plate, the active material, and the like may be discharged to the outside of the can 110. For example, the notch 112a, 112b, and/or 112c act as vents to prevent the secondary battery 10 from exploding (e.g., from an uncontrolled explosion). Thus, a vent may be omitted from the cap assembly 190, which will be described later.

As illustrated in FIG. 1A, a beading part (e.g., a bead or bead portion) 116 concavely formed inwardly from (or on) an outer circumferential surface of the side part 114 may be disposed adjacent to the opening in the side part 114. When the cap assembly 190 is seated on the beading part 116, an upper end of the can 110 is bent inwardly to fix the cap assembly 190 to the can 110. Here, an end of a crimping part 118 may be electrically connected to the cap assembly 190, which will be described later. When the electrolyte and the electrode assembly 130 are accommodated in the can 110, the cap assembly 190 may be coupled to the can 110 at the opening therein to close and seal the opening.

The electrode assembly 130 includes a first electrode plate, a second electrode plate, and a separator. The first electrode plate may be a negative electrode plate on which a negative electrode active material layer (e.g., graphite, carbon, etc.) is disposed on both surfaces (e.g., opposite surfaces) thereof. A first electrode non-coating portion to which the negative electrode active material layer is not applied may be a portion of the first electrode plate. The second electrode plate may be a positive electrode plate on which a positive electrode active material layer (e.g., transition metal oxide ($LiCoO_2$, $LiNiO_2$, $LiMn_2O_4$, etc.)) is disposed on both surfaces (e.g., opposite surfaces) thereof. A second electrode non-coating portion to which the positive electrode active material layer is not applied may be a portion of the second electrode plate. The separator may be interposed between the first electrode plate and the second electrode plate to prevent a short circuit from occurring thereby while allowing lithium ions to move. The first electrode plate may be made of copper (Cu) or nickel (Ni) foil, the second electrode plate may be made of aluminum (Al) foil, and the separator may be made of polyethylene (PE) or polypropylene (PP), but the present disclosure is not limited thereto.

The first electrode plate, the second electrode plate, and the separator may be wound in a substantially cylindrical shape and accommodated in the can 110. The first electrode plate and the second electrode plate may be disposed so that the first and second electrode non-coating portions, to which the active material is not applied, are opposite to each other in the winding.

For example, the first electrode plate, which is the negative electrode plate, may be disposed so that the first electrode non-coating portion faces a lower side with reference to FIG. 1A (e.g., to face the bottom part 112). The second electrode plate, which is a positive electrode plate, may be disposed to face an upper side with reference to FIG. 1A (e.g., to face the cap assembly 190). The separator may be disposed between the first electrode plate and the second electrode plate and wound in a state in which the separator insulates the first and second electrode plates from each other. Thereafter, the first electrode collecting plate 150 may be electrically connected to the first electrode non-coating portion, and the second electrode collecting plate 170 may be electrically connected to the second electrode non-coating portion. Thus, the can 110 and the cap assembly 190 are electrically connected to the electrode assembly 130.

The first electrode collecting plate 150 may be electrically connected to the bottom part 112 of the can 110 via welding or the like. Since the first electrode collecting plate 150 is electrically connected to the first electrode non-coating portion, the first electrode collecting plate 150 may be defined as a negative electrode collecting plate. The second electrode collecting plate 170 may be electrically connected to the cap assembly 190 by a collecting lead 180. Because the second electrode collecting plate 170 is electrically connected to the second electrode non-coating portion, the second electrode collecting plate 170 may be referred to as a positive electrode collecting plate.

As illustrated in FIG. 1A, the cap assembly 190 may include a cap plate 191, a rivet terminal 192 coupled to a center of the cap plate 191, an insulator 193 insulating the rivet terminal 192 from the cap plate 191, and a stopper 196 fixing the rivet terminal 192. The components and/or structure of the insulator may vary according to embodiments. For example, in some embodiments, the stopper 196 may be omitted.

The cap plate 191 is substantially disk shaped and has an opening (e.g., a hole) into which the rivet terminal 192 in the center of the cap plate 191. The cap plate 191 may be made of a nickel-plated material or a SUS material on a cold rolled steel sheet, such as SPCE. The cap plate 191 may be seated on the beading part 116. An outer edge of the cap plate 191 may be insulated from the side part 114 of the can 110 by a gasket 198. An inner edge of (e.g., an edge of the opening in) the cap plate 191 may be insulated from the rivet terminal 192 by the insulator 193.

The rivet terminal 192 is inserted into the opening in the cap plate 191 and may be electrically connected to the second electrode collecting plate 170, which is a positive electrode collecting plate, by the collecting lead 180. For example, the rivet terminal 192 may be made of the same or a similar material as the collecting lead 180 or the second electrode collecting plate 170. A portion of the rivet terminal 192 exposed to an upper portion of (e.g., on an outer surface of) the cap plate 191 may have a diameter greater than that of a portion thereof inserted into the opening in the cap plate 191 (e.g., a portion of the rivet terminal 192 on an inner surface of the cap plate 191). For convenience, the portion of the rivet terminal 192 that is exposed to the upper portion of the cap plate 191 is referred to as an upper end of the rivet terminal 192, and a portion of the rivet terminal 192 that faces the second electrode collecting plate 170 is referred to as a lower end of the rivet terminal 192. The lower end of the rivet terminal 192 may be compression-deformed (e.g., compression-molded) by a processing method, such as pressing or spinning, to be in close contact with a bottom surface (or inner surface) of the cap plate 191. To more firmly fix the rivet terminal 192, a hollow ring-shaped stopper 196 may be additionally provided. After the rivet terminal 192 is inserted into the opening in the cap plate 191, the press or spinning processing may be performed when the stopper 196 is inserted into (or onto) the lower end of the rivet terminal 192. The lower end of the rivet terminal 192 is compressed and deformed to be in close contact with the stopper 196 and to be in close contact with the cap plate 191 together with the stopper 196. Because the insulator 193 is provided between the cap plate 191 and the rivet terminal 192, the stopper 196 may also be in close contact with the insulator 193.

The gasket 198 may be made of an insulating material and may be arranged to surround (or extend around) an outer edge and a portion of a bottom surface of the cap plate 191 but may not extend to a top surface (or outer surface) of the cap plate 191. Thus, when the crimping part 118 is formed when the cap plate 191 is seated on an upper portion of the beading part 116 with the gasket 198 therebetween, the crimping part 118 may contact the top surface of the cap plate 191. In this state, the can 110 and the cap plate 191 are electrically connected to each other by welding an end of the crimping part 118 to the cap plate 191 to form a welding part (e.g., a weld or a weld bead) 197. After welding the end of the crimping part 118 to the cap plate 191, a resin-based material may be applied around the welding part 197 to prevent rust from occurring. The cap plate 191 may be electrically connected to the can 110, which is electrically connected to the first electrode collecting plate 150, which is the negative electrode collecting plate, by the welding portion 197, and thus, may have a negative polarity. Thus, because the cap plate 191 acts as the negative electrode, and the rivet terminal 192 acts as the positive electrode, both the positive and negative electrodes are provided in the cap assembly 190.

A cylindrical secondary battery according to another embodiment, may have a can with a structure different from that of the secondary battery 10 illustrated in FIG. 1A.

Figure 2A:
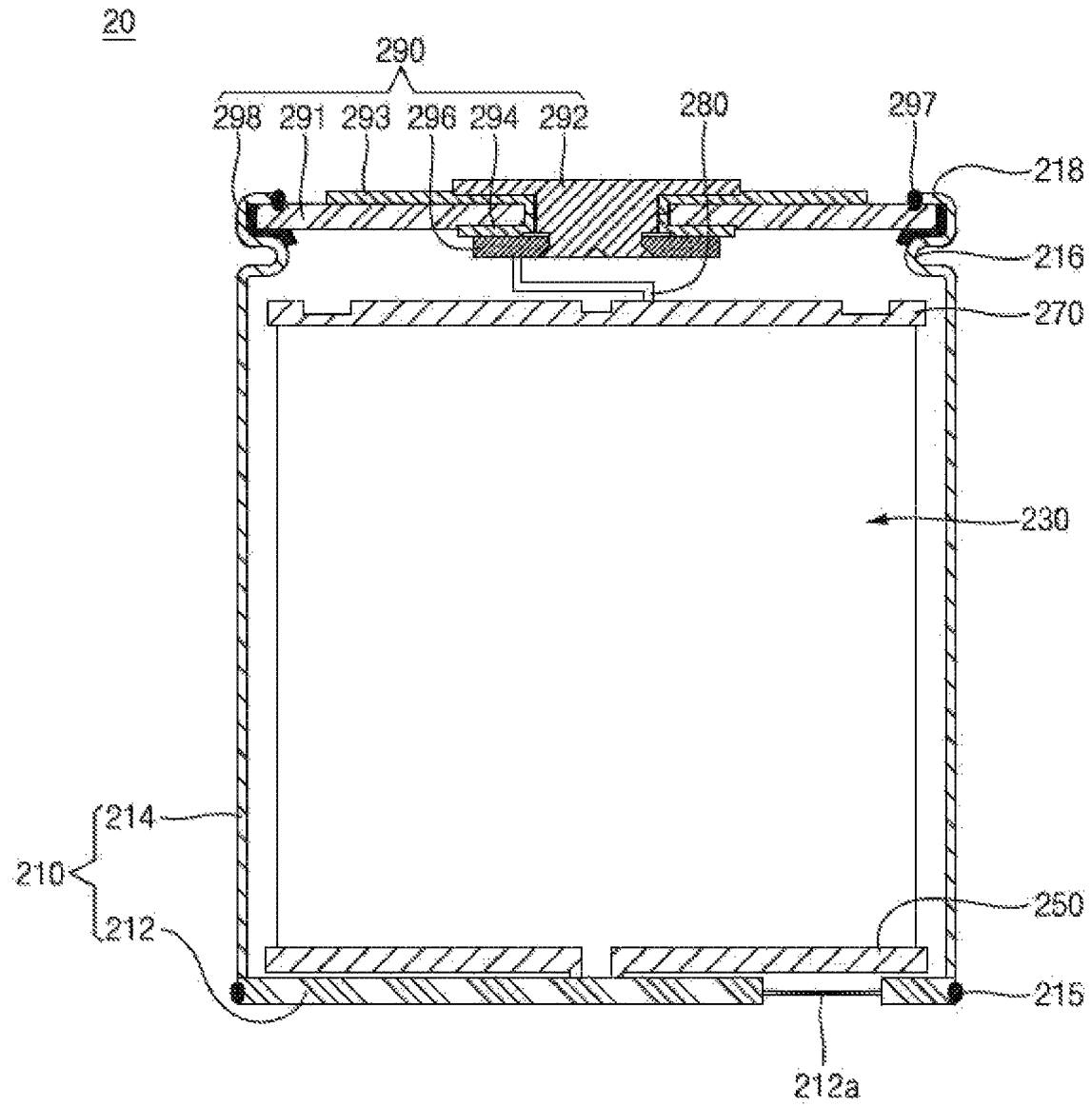
FIG. 2A is a cross-sectional view of a cylindrical secondary battery according to another embodiment.
Figure 2B:
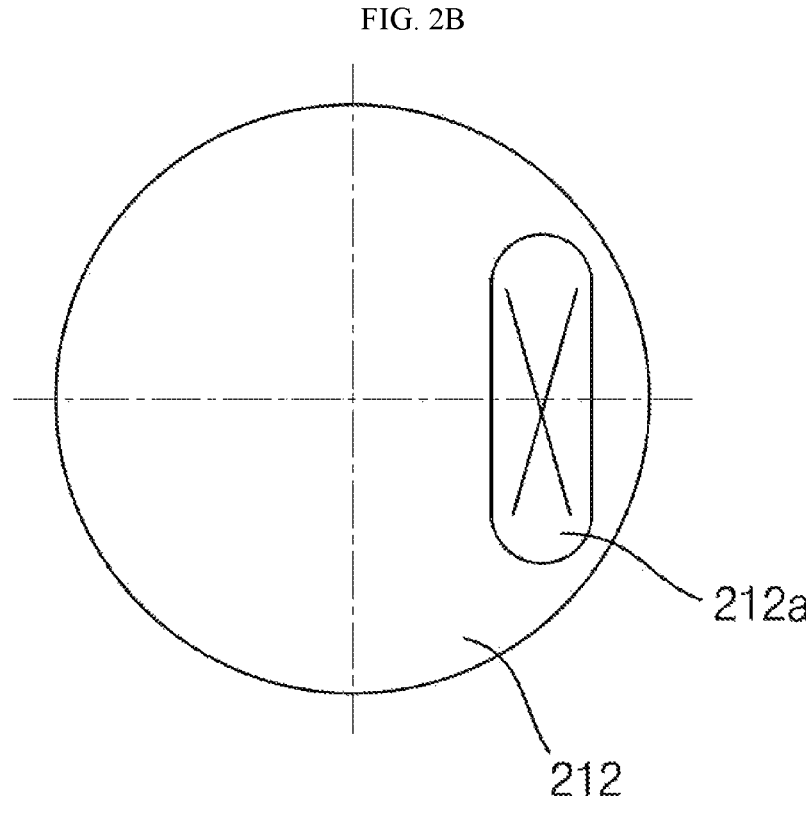
FIG. 2B is a plan view illustrating a bottom part and a notch of the cylindrical secondary battery illustrated in FIG. 2A.

FIG. 2A is a cross-sectional view of a cylindrical secondary battery according to another embodiment, and FIG. 2B is a plan view illustrating a bottom part and a notch of the cylindrical secondary battery illustrated in FIG. 2A. Hereinafter, features that are the same or substantially similar to those described above may not be described again.

As illustrated in FIG. 2A, a cylindrical secondary battery 20 may include a cylindrical can 210, an electrode assembly 230 inserted into (or accommodated in) the can 210, a cap assembly 290 coupled to one end of the can 210, and first and second electrode collecting plates 250 and 270 electrically connecting the electrode assembly 230 to the cap assembly 290.

The can 210 may include a separately provided circular bottom part 212 and a cylindrical side part 214 having opened upper and lower sides (or ends). The cap assembly 290 is coupled to the opened upper end of the side part 214, and the bottom part 212 is coupled to the opened lower end of the side part 214. An outer edge of the bottom part 212 may be welded to the side part 214, forming a welding part 215 such that the bottom part 212 and the side part 214 are electrically connected to each other. The can 210 may be electrically connected to the cap assembly 290 by welding the end of the beading part 218 and the cap plate 291 to form a welding portion 297. Further, a vent 212a may be provided in the bottom part 212. The vent 212a may be separately provided (or separately formed) and coupled and welded to a through-hole, which passes through the bottom part 212 (see, e.g., FIG. 2B).

In the secondary batteries 10 and 20 illustrated in FIGS. 1A and 2A, the cap assemblies 190 and 290 may have various structures.

Figure 3A:
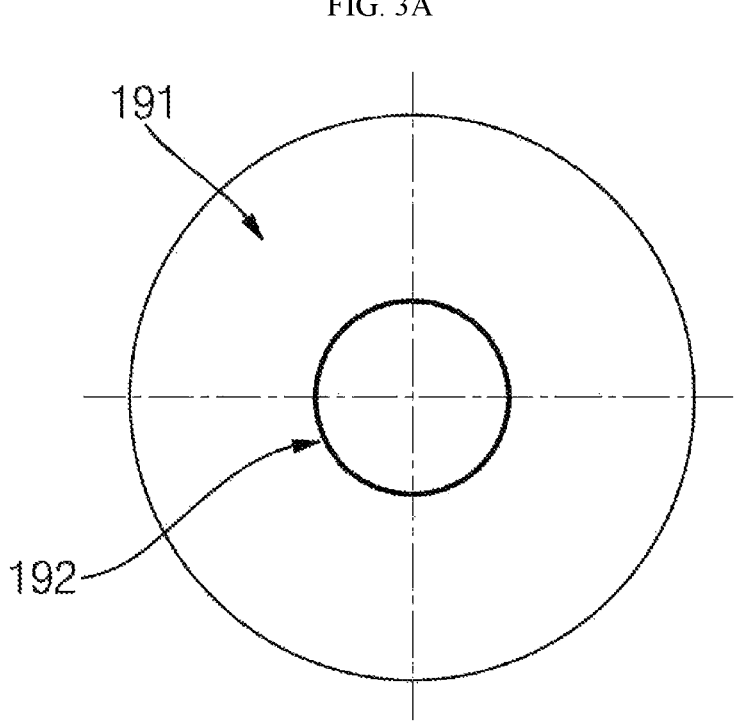
FIGS. 3A and 3B are plan views illustrating a terminal of a cap assembly according to various embodiments.
Figure 3B:
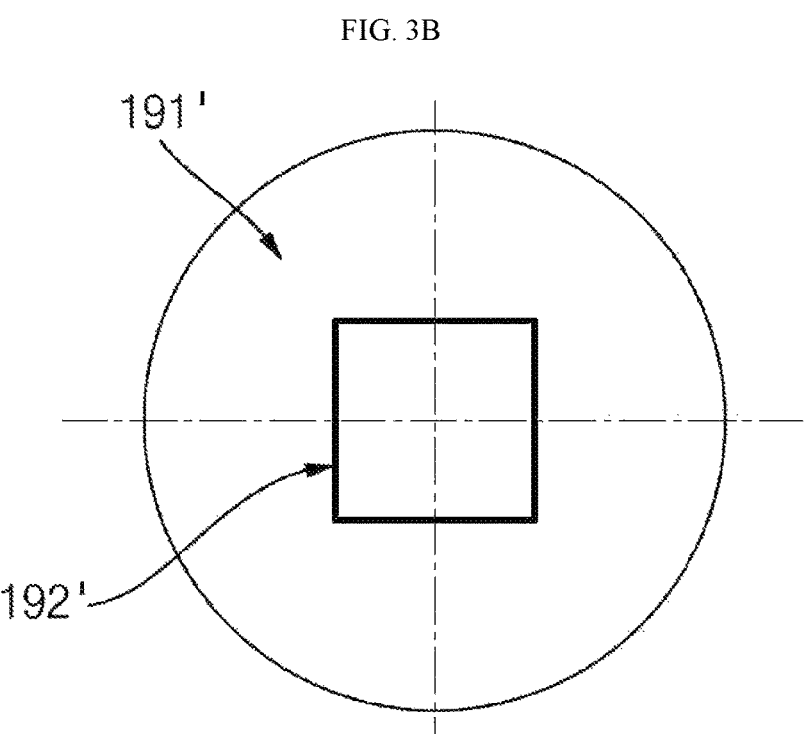
Figure 4A:
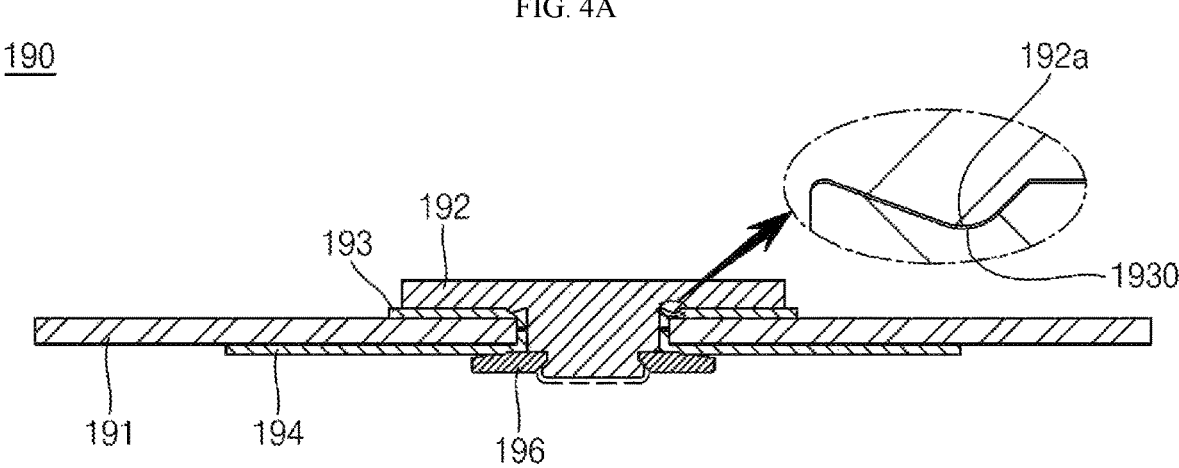
FIGS. 4A to 4C are cross-sectional views illustrating a cap assembly according to various embodiments.
Figures 4B, 4C:
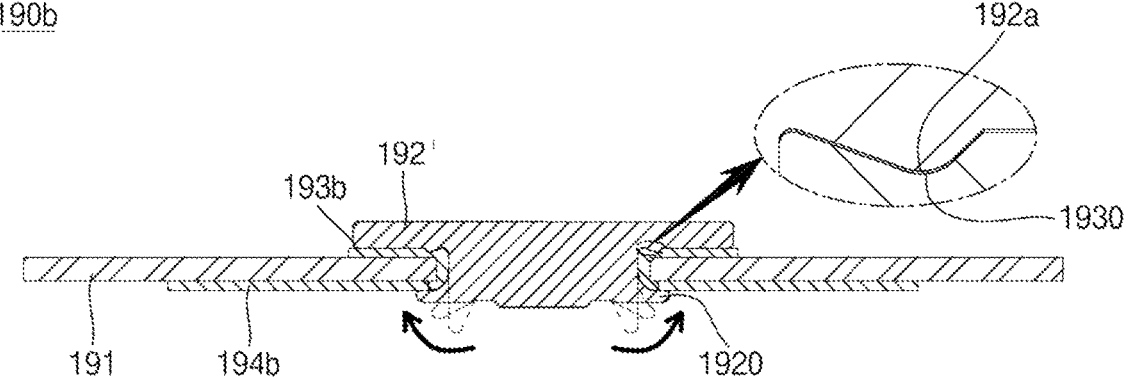

FIGS. 3A and 3B are plan views illustrating a terminal of the cap assembly according to embodiments of the present disclosure. FIGS. 4A to 4C are schematic cross-sectional views of a cap assembly according to various embodiments. For convenience, reference numerals are denoted based on the embodiment of FIG. 1A.

First, as illustrated in FIG. 3A, an upper end of the rivet terminal 192 coupled to the cap plate 191 may have a circular shape. In another embodiment, as illustrated in FIG. 3B, an upper end of a rivet terminal 192' coupled to the cap plate 191' may be a square shape. However, these shapes of the rivet terminal are merely examples and the rivet terminal is not limited to the above-described shapes.

FIG. 4A is a detailed cross-sectional view of the cap assembly 190 illustrated in FIG. 1A. As illustrated in FIG. 4A, a bottom surface of the upper end of the rivet terminal 192 may have a protrusion 192a protruding toward the cap plate 191. The insulator of the cap assembly 190 may be made of a PE or PP material and may include an upper insulator 193 and a lower insulator 194. An accommodation groove 1930 into which the protrusion 192a is accommodated may be defined in a top surface of the upper insulator 193. The protrusion 192a may be disposed adjacent to a portion of the rivet terminal 192 that is inserted into and passing through the cap plate 191. The rivet terminal 192 and the upper insulator 193 may be more securely coupled by the protrusion 192a and the accommodation groove 1930.

The upper insulator 193 may have a circular plate shape in which an opening corresponding to the opening in the cap plate 191 is defined. A hollow-side inner edge of the upper insulator 193 may extend downwardly toward the second electrode collecting plate 170. The circular plate portion of the upper insulator 193 contacts a bottom surface of the upper end of the rivet terminal 192 to insulate the cap plate 191 from the upper end of the rivet terminal 192. Accordingly, the circular plate portion of the upper insulator 193 may have a size greater than that of the upper end of the rivet terminal 192. In addition, the circular plate portion of the upper insulator 193 may have a size (e.g., a diameter) less or greater than that of the circular plate portion of the lower insulator 194. A downwardly extending portion of the upper insulator 193 is inserted into the opening in the cap plate 191 to insulate the cap plate 191 from the rivet terminal 192.

The lower insulator 194 may be disposed to be symmetrical to the upper insulator 193 and may have a shape similar to that of the upper insulator 193. For example, the lower insulator 194 may have a circular plate shape in which an opening corresponding to the opening in the cap plate 191 is defined. A hollow-side inner edge of the lower insulator 194 may extend toward the upper insulator 193. The circular plate portion of the lower insulator 194 contacts a top surface of the stopper 196 to insulate the cap plate 191 from the stopper 196. The circular plate portion of the lower insulator 194 may have a size (e.g., a diameter) greater than that of the stopper 196 and less than that of the cap plate 191. An upwardly extending portion of the lower insulator 194 is inserted into the opening in the cap plate 191 to insulate the cap plate 191 from the rivet terminal 192. Extending ends of the upper insulator 193 and the lower insulator 194 may be connected to each other through an adhesive or the like or may be pressed to be in close contact with each other during the compression molding of the rivet terminal 192.

The stopper 196 may have an inclined shape in which a diameter of the inner edge (e.g., a diameter of the opening therein) gradually increases from the top surface to the bottom surface thereof. A position of the lower end of the rivet terminal 192 before the process of compression-molding and fixing the rivet terminal 192 is shown in FIG. 4A by the dotted line. As the rivet terminal 192 is compression-molded, the rivet terminal 192 may be pressed upwardly from the position of the dotted line. When the inside of the stopper 196 is inclined, the lower end of the rivet terminal 192 is spread along the shape of the inner edge of the stopper 196 while being compression-molded. Thus, a contact area between the rivet terminal 192 and the stopper 196 may increase to improve the coupling force of the rivet terminal 192. Also, the stopper 196 may be made of a material that is the same as or similar to that of the rivet terminal 192. Thus, the above-described collecting lead 180 may be electrically connected to the rivet terminal 192 or electrically connected to the stopper 196 according to various embodiments.

FIG. 4B illustrates an embodiment similar to the embodiment illustrated in FIG. 4A but in which an insulator has a different structure. As illustrated in FIG. 4B, the insulator may include an upper insulator 193a, an inner insulator 195a, and a lower insulator 194a.

The upper insulator 193a may have a hollow circular plate shape. An outer edge of an upper portion of the inner insulator 195a may be disposed to be in close contact with an opening in the upper insulator 193a. The inner insulator 195a may be made of a PE, PP, or PFA material and may have cylindrical upper and lower ends, which are bent toward the upper insulator 193a and the lower insulator 194a, respectively, to extend by a length (e.g., a predetermined length). The lower insulator 194a may have a hollow circular plate shape, and an outer edge of a lower portion of the inner insulator 195a may be disposed to be in close contact with an opening in the lower insulator 194a.

FIG. 4C illustrates an embodiment that is similar to the embodiment illustrated in FIG. 4B but in which an insulator has a different structure and a stopper is omitted. As illustrated in FIG. 4C, the insulator may include an upper insulator 193b and a lower insulator 194b.

The upper insulator 193b may have a form in which the upper insulator 193a and the inner insulator 195a shown in FIG. 3B are integrated with each other. For example, the upper insulator 193b may have a cylindrical shape that is integrated with a hollow circular plate-shaped portion. The cylindrical portion may be inserted into the opening in the cap plate 191. A lower end of the cylindrical portion may be bent toward the lower insulator 194b to extend by a length (e.g., a predetermined length). The lower insulator 194b may also have a hollow circular plate shape, and an outer edge of a lower portion of the upper insulator 193b may be disposed to be in close contact with the opening in the cap plate 191.

In addition, in the cap assembly 190 of FIG. 4C, the stopper may be omitted, and the rivet terminal 192' may have a rib 1920. The rib 1920 may extend from the lower end of the rivet terminal 192' in a substantially cylindrical shape. When the rivet terminal 192' is compression-molded, the rib 1920 may be deformed outwardly along an arrow direction to be in close contact with the lower insulator 194. FIG. 4C illustrates a shape of the rib 1920, and a process of deforming the rib 1920 is illustrated in FIG. 4C by the dotted line. Due to this structure, the rivet terminal 192' may be more firmly coupled to the cap plate 191 without a separate stopper.

The shapes of the rivet terminals 192 and 192' illustrated in FIGS. 3A and 3B may be applied to both the secondary batteries 10 and 20 illustrated in FIGS. 1A and 2A. In addition, the structures of the cap assemblies 190, 190a, and 190b illustrated in FIGS. 4A to 4C may also be applied to the secondary batteries 10 and 20 illustrated in FIGS. 1A and 2A. In addition, when the stopper is omitted, any one of the insulator structures illustrated in FIGS. 4A to 4C may be applied, and the structure illustrated in FIG. 4C may be applied to the structure of the rivet terminal 192'.

As described above, because both the positive electrode and the negative electrode are disposed in the (e.g., face in) one direction of the secondary battery, the welding of the secondary battery with the bus bar may be relatively easy, and the connection structure of the bus bar may be simplified. In addition, because the welding area is widened by the rivet-type terminal structure, weldability with the bus bar may be improved.

According to embodiments of the present disclosure, because both the positive electrode and the negative electrode are disposed in the one direction of the secondary battery, the welding with the bus bar may be relatively easy and the connection structure of the bus bar may be simplified.

The above-described embodiments are merely examples of the present disclosure, and thus, the present disclosure is not limited to the foregoing embodiments. It will be understood by those of ordinary skill in the art that various changes in form and details may be made to the described embodiments without departing from the spirit and scope of the present disclosure as defined by the following claims and their equivalents.

What is claimed is:

1. A cylindrical secondary battery comprising:
an electrode assembly comprising a first electrode plate and a second electrode plate;
a can having a bottom part and a cylindrical side part, configured to accommodate the electrode assembly, and electrically connected to the first electrode plate;
a cap assembly comprising:
a cap plate coupled to one end of the cylindrical side part and electrically connected to the cylindrical side part; and
a rivet terminal insulated from the cap plate and electrically connected to the second electrode plate; and
a gasket configured to contact a portion of the side and bottom of the cap plate.

2. The cylindrical secondary battery of claim 1, further comprising:
a first electrode collecting plate electrically connected to the first electrode plate and electrically connected to the bottom part; and
a second electrode collecting plate electrically connected to the second electrode plate and electrically connected to the rivet terminal,
wherein the first electrode plate is a negative electrode plate, and the second electrode plate is a positive electrode plate.

3. The cylindrical secondary battery of claim 1, further comprising an insulator configured to insulate the rivet terminal from the cap plate.

4. The cylindrical secondary battery of claim 3, wherein the can comprises:
a beading part at one end of the cylindrical side part that is opened, the beading part being concavely bent inwardly; and
a crimping part spaced apart from the beading part and in which one end of the cylindrical side part is bent,
wherein an end of the crimping part is electrically connected to the cap plate.

5. The cylindrical secondary battery of claim 4, wherein the gasket is spaced apart from the crimping part and is between an outer edge of the cap plate and the beading part.

6. The cylindrical secondary battery of claim 3, wherein the rivet terminal has a protrusion that protrudes toward a top surface of the cap plate, and
wherein the insulator comprises an accommodation groove that accommodates the protrusion.

7. The cylindrical secondary battery of claim 3, further comprising a stopper coupled to an end of the rivet terminal that faces the electrode assembly so that the rivet terminal and the insulator are in close contact with each other.

8. The cylindrical secondary battery of claim 7, wherein the stopper has an opening that the rivet terminal passes through, and
wherein the opening in the stopper has a diameter that gradually increases from a top surface to a bottom surface thereof.

9. The cylindrical secondary battery of claim 3, wherein the rivet terminal further comprises a rib extending from an end facing the electrode assembly to be in close contact with the insulator.

10. The cylindrical secondary battery of claim 1, wherein the bottom part is welded to or integrated with the cylindrical side part and comprises a notch or vent.

\*    \*    \*    \*    \*